(No Model.) 2 Sheets—Sheet 1.

W. W. McNEAL.
MACHINE FOR TURNING TELEGRAPH PINS.

No. 421,654. Patented Feb. 18, 1890.

WITNESSES:

INVENTOR
W. W. McNeal
BY Munn & Co.
ATTORNEY (No Model.) 2 Sheets—Sheet 2.

W. W. McNEAL.
MACHINE FOR TURNING TELEGRAPH PINS.

No. 421,654. Patented Feb. 18, 1890.

WITNESSES:
John M. Deemer
C. Sedgwick

INVENTOR
W. W. McNeal
BY Munn & Co
ATTORNEY

UNITED STATES PATENT OFFICE.

WILLIAM W. McNEAL, OF STOCKTON, NEW JERSEY.

MACHINE FOR TURNING TELEGRAPH-PINS.

SPECIFICATION forming part of Letters Patent No. 421,654, dated February 18, 1890.

Application filed February 16, 1889. Serial No. 300,110. (No model.)

*To all whom it may concern:*

Be it known that I, WILLIAM W. MCNEAL, of Stockton, in the county of Hunterdon and State of New Jersey, have invented a new and Improved Machine for Turning Telegraph-Pins, of which the following is a full, clear, and exact description.

This invention relates to wood-turning machines, the object of the invention being to provide a machine organized to produce telegraph-pins or analogous articles.

To the ends named the invention consists of novel constructions, arrangements, and combinations to be hereinafter more fully described, and specifically pointed out in the claims.

Reference is to be had to the accompanying drawings, forming a part of this specification, in which similar figures and letters of reference indicate corresponding parts in all the views.

Figure 1:
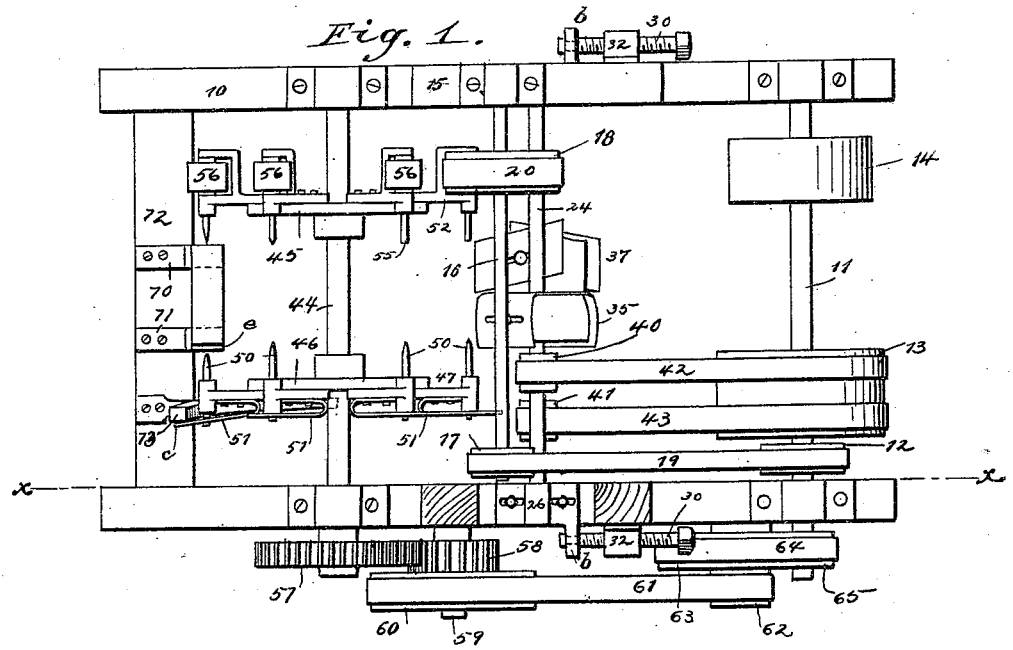
Figure 2:
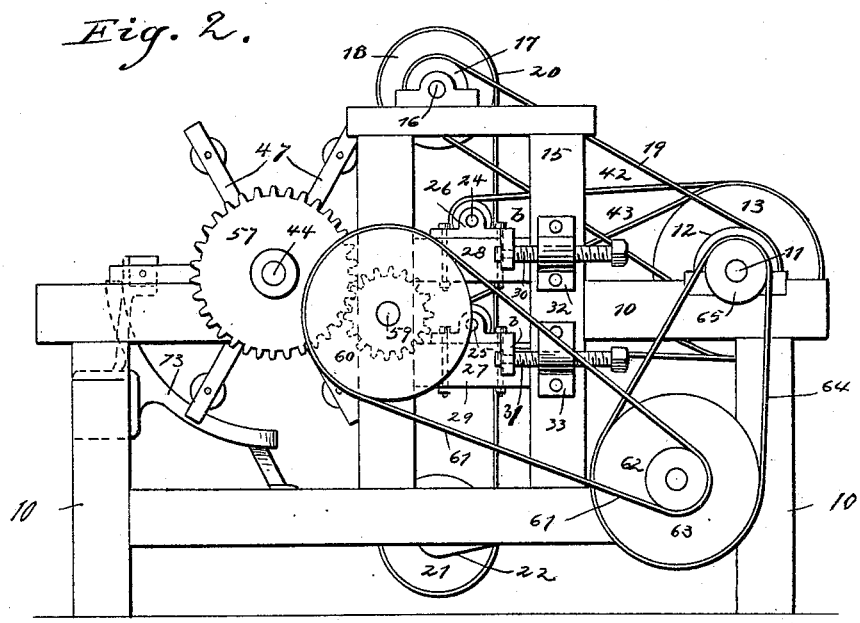
Figure 3:
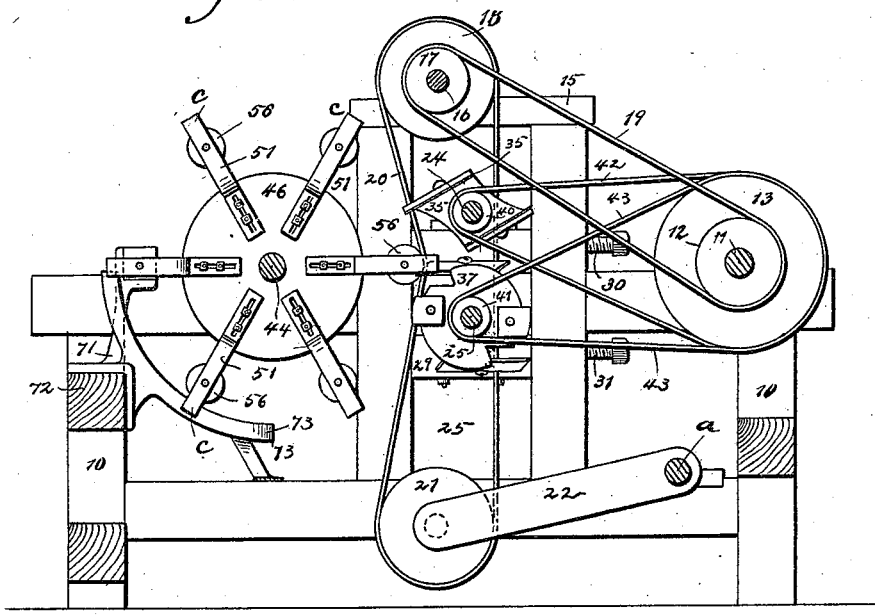
Figure 4:
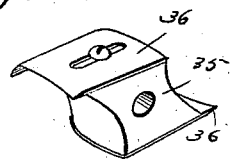
Figure 5:
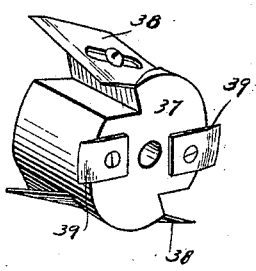
Figure 6:
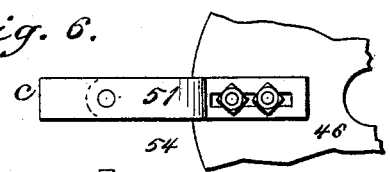
Figure 7:
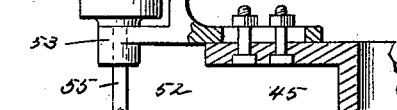
Figure 7:
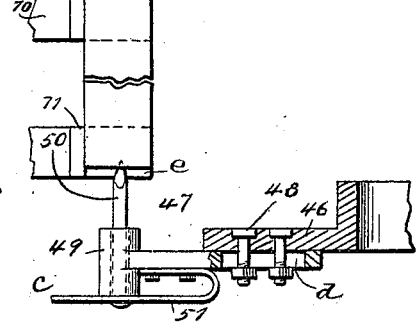

Figure 1 is a plan view of the machine, parts being shown in section. Fig. 2 is a side view of the machine. Fig. 3 is a sectional elevation taken on line $x$ $x$ of Fig. 1. Fig. 4 is a perspective view of one of the cutter-heads. Fig. 5 is a perspective view of the other cutter-head. Fig. 6 is a detail view illustrating the connection between one of the block-supporting arms and its disk; and Fig. 7 is an enlarged detail view, in partial section, illustrating the construction of the block-supporting standards and the mandrel and center-pin-carrying arms.

In the drawings, 10 represents the main supporting-frame, upon which there is mounted a driving-shaft 11, which carries pulleys 12, 13, and 14, the pulley 14 being the one that is engaged by the driving-belt. The frame 10 is formed with upwardly-extending side sections 15, which serve as supports for a shaft 16, that carries pulleys 17 and 18, the shaft being driven by a belt 19, which runs in connection with the pulleys 12 and 17. Upon the pulley 18 there is mounted a belt 20, a proper tension being imparted to said belt by an idler 21, about which the belt runs, said idler being supported by an arm 22, that is pivotally mounted at $a$. (See Fig. 3.)

Beneath the shaft 16, I mount shafts 24 and 25, said shafts being journaled in adjustable bearings 26 and 27, that are arranged so that they may be bolted to their supporting cross-bars 28 and 29, but may be moved forward or back by screws 30 and 31, said screws engaging threaded brackets 32 and 33, that are carried by the frame, the ends of the screws being arranged to engage projections $b$ and $b'$, which extend outward from the bearings 26 and 27.

The shaft 24 carries a cutter-head 35, upon which there are mounted blades 36, said blades being formed with slots and held to the cutter-head by set-screws, so that a proper adjustment of the blades may be secured. This cutter-head is adapted to form the bodies of the pins, while upon the shaft 25 there is mounted a cutter-head 37, carrying adjustably-mounted blades 38 and other blades 39, the blades 38 acting to form the pin-shanks, while the blades 39 cut the shoulder between the shanks and the pin-bodies. The shafts 24 and 25 carry pulleys 40 and 41, about which there are passed belts 42 and 43, said belts running in connection with the pulley 13.

In order that the blocks may be supported at the time they are being acted upon by the blades of the cutter-heads 35 and 37, I provide a shaft 44, which carries disks 45 and 46. To the disk 46 there are bolted arms 47, said arms being formed with slots $d$, through which the retaining-bolts 48 pass, this arrangement providing for a proper adjustment of the arms. The arms 47 are provided with sockets 49, through which there are passed center pins 50, the outer ends of the pins being connected to springs 51, that are secured to the arms 47, the springs, however, extending outward beyond the arm-sockets, such outwardly-extending portions being shown at $c$.

To the disk 45, I bolt arms 52, such arms being also formed with slots through which the retaining-bolts pass. At the ends of the arms 52 there are formed sockets 53, and the arms carry brackets 54, the sockets and the brackets forming bearings for mandrels 55, which carry pulleys 56, said pulleys being rigidly connected to the mandrels and arranged between the outer faces of their supporting-arms and the brackets carried by said arms.

In order that a slow motion may be imparted to the shaft 44, I provide said shaft with a gear 57, that is driven by a pinion 58, mounted on a short shaft or stud 59, which extends outward from the frame 10, such shaft carrying a large pulley 60, that is driven by a belt 61, said belt being in turn driven by a small pulley 62, mounted upon a shaft which carries a large pulley 63, that is driven by a belt 64, said belt running in engagement with a small pulley 65, that is carried by the shaft 11.

The above connections are such as I employ; but any other speed-reducing connections could be substituted therefor.

In order that the blocks from which the pins are to be turned may be supported in position such that they will be automatically grasped by the mandrels and center pins, I provide supporting-brackets 70 and 71, which extend upward from the cross-bar 72 of the frame 10, the bracket 71 being provided with an upwardly-extending flange e, which constitutes a gage, the right-hand end of the block being placed against such gage, as shown in Fig. 1; and in order that the blocks may be discharged after having been operated upon I provide a cam 73, against which the extending sections c of the springs 51 strike as the shaft 44 revolves, the block being forced from its supporting-mandrel when it strikes against the under side of the brackets 70 and 71, the cam 73 being so proportioned as to release the spring 51, so that the center pin 50, connected to the spring, will be forced forward against the center of the end of the block. Then as the shaft 44 revolves the pulley 56, controlling the mandrel 55, will bear against the belt 20, and a rotary motion will be imparted to the block carried by the center pin and mandrel as the block approaches the line of travel of the blades of the cutter-heads 35 and 37, so that when a pin is being formed the block is rotating as well as the cutter-heads which operate upon it.

The machine above described is exceedingly simple, is not liable to get out of order, and when in operation will produce a much larger number of pins in a given time than any other machine heretofore employed for the purpose.

The shafts 24 and 25 are adjustably mounted, in order that the diameter of the articles reduced by the action of the machine may be varied at will.

Having thus described my invention, I claim as new and desire to secure by Letters Patent—

1. In a machine for turning telegraph-pins, the combination, with revolving cutters and a traveling endless belt, of revolving arms carrying center pins and mandrels, and means for revolving the mandrels from the endless belt when the blocks carried by them and the center pins approach the line of travel of the cutters, substantially as described.

2. In a machine for turning telegraph-pins, the combination, with revolving cutters and a vertically-traveling endless belt, of revolving arms arranged in front of the cutters and endless belt and provided with center pins and mandrels, and pulleys on the mandrels for contacting with the endless belt as the arms are revolved, substantially as and for the purpose set forth.

3. In a machine for turning telegraph-pins, the combination, with revolving and socketed arms, of springs secured to the arms, center pins secured to the springs a short distance from their ends and projecting through the sockets, and a cam for engaging the projecting end of the springs, substantially as and for the purpose specified.

4. The combination, with the bits and center pins of a wood-turning machine, of springs formed with outwardly-extending sections and connected to the center pins, a cam-face against which the outwardly-extending spring-sections bear, and block-supporting standards, one of said standards being formed with a gage, substantially as described.

5. The combination, with a shaft and a means for driving the same, of arms carried by the shaft, center pins carried by the arms, springs arranged in connection with the pins and formed with outwardly-extending sections, a cam upon which the outwardly-extending spring-sections bear at times, block-supporting standards, other arms carried by the shaft, mandrels carried by the arms, pulleys carried by the mandrels, a belt against which the pulleys bear at times, cutter-heads, and a means for driving said heads, substantially as described.

WILLIAM W. McNEAL.

Witnesses:
HARRY D. MASON,
ELMER ROBERSON.